(12) United States Patent
Biran

(10) Patent No.: US 11,268,790 B2
(45) Date of Patent: Mar. 8, 2022

(54) FIRING-SIMULATION SCOPE

(71) Applicant: Airbus Defence and Space SAS, Toulouse (FR)

(72) Inventor: Hervé Biran, Houilles (FR)

(73) Assignee: Airbus Defence and Space S.A.S., Toulouse (FR)

( * ) Notice: Subject to any disclaimer, the term of this patent is extended or adjusted under 35 U.S.C. 154(b) by 360 days.

(21) Appl. No.: 16/463,294

(22) PCT Filed: Nov. 23, 2017

(86) PCT No.: PCT/EP2017/080172
§ 371 (c)(1),
(2) Date: Jun. 21, 2019

(87) PCT Pub. No.: WO2018/096023
PCT Pub. Date: May 31, 2018

(65) Prior Publication Data
US 2019/0316881 A1    Oct. 17, 2019

(30) Foreign Application Priority Data
Nov. 24, 2016 (FR) .................................. 16/01663

(51) Int. Cl.
*F41G 3/26* (2006.01)
*F41A 33/04* (2006.01)
*G09B 9/00* (2006.01)

(52) U.S. Cl.
CPC ............ *F41G 3/2644* (2013.01); *F41A 33/04* (2013.01); *F41G 3/2694* (2013.01); *G09B 9/003* (2013.01)

(58) Field of Classification Search
CPC ...... F41G 3/2644; F41G 3/2694; F41A 33/04; G09B 9/003
(Continued)

(56) References Cited

U.S. PATENT DOCUMENTS 10,032,389 B2   7/2018  Biran et al.
2009/0155747 A1  6/2009  Cornett et al.
(Continued)

FOREIGN PATENT DOCUMENTS

FR        3007161 A1    12/2014

OTHER PUBLICATIONS

International Search Report; priority document.

*Primary Examiner* — Robert P Bullington
(74) *Attorney, Agent, or Firm* — Greer, Burns & Crain, Ltd.

(57) ABSTRACT

A firing simulation scope, for installation on a rifle, includes an inertial measurement unit, a windage correction adjustment device, an electronic system, a microphone, a display and an interface for connection to a control station. The electronic system is configured for: receiving, via the connection interface, video data representing a field of view, through a simulated scope, in the virtual environment; displaying on the display the received video data; obtaining a real time audio microphone recording; comparing the audio recording with a predetermined firing-triggering signature of the rifle; and transmitting, to the control station via the connection interface, when the audio recording matches the predetermined signature, a firing triggering detection signal associated with inertial measurements supplied by the first inertial measurement unit and with a first adjustment setting supplied by the windage correction adjustment device, to enable the control station to determine a firing trajectory in the virtual environment.

13 Claims, 7 Drawing Sheets

(58) Field of Classification Search
USPC .......................................................... 434/16
See application file for complete search history.

(56) References Cited

U.S. PATENT DOCUMENTS

2011/0207089 A1* 8/2011 Lagettie ................ F41G 3/2611
434/22
2016/0169627 A1 6/2016 Northrup et al.

* cited by examiner

| T (°C) |      |
|--------|------|
| +45    | -1.5 |
| +25    | -1   |
| +15    | -0.5 |
| +5     | 0    |
| 0      | 0.5  |
| -5     | 1    |
| -15    | 1.5  |

| P (hPa) |       |
|---------|-------|
| 990     | -0.25 |
| 960     | -1    |
| 930     | -1.75 |
| 900     | -2.5  |
| 870     | -3.25 |
| 840     | -4    |
| 810     | -4.75 |

| D (m) |        |
|-------|--------|
| 1000  | -30.75 |

| t (s) |
|-------|
| 1.6   |

FIRING-SIMULATION SCOPE

CROSS-REFERENCES TO RELATED APPLICATIONS

This application claims the benefit of the International Application No. PCT/EP2017/080172, filed on Nov. 23, 2017, and of the French patent application No. 1601663 filed on Nov. 24, 2016 the entire disclosures of which are incorporated herein by way of reference.

FIELD OF THE INVENTION

The present invention relates to a firing-simulation scope suitable for training soldiers in a virtual environment.

BACKGROUND OF THE INVENTION

To allow training soldiers without risks, systems for reconstitution, by virtual environment, of battlefield operational environments have been developed. Mention can be made for example of the system described in the patent document FR 3 007 161 A1.

Marksmen do however require particular simulation conditions. Indeed, marksmen are soldiers who have acquired with experience a large number of automatic reflexes in handling their rifle. Current systems for simulating operational battlefield environments use rifles that are dedicated to simulation and which therefore do not have the exact behavior of the rifle normally used by the soldier on the ground. This falsifies the automatic reflexes acquired by the soldier and prevents complete immersion of the soldier in the mission scenario reproduced in the virtual environment.

There exist systems adapting to existing weapons for training in firing without having recourse to actual bullets. Mention can be made, for example, of the SureStrike (registered trade mark) system from the company Laser Ammo, which comprises a special cartridge connected to a laser marking device to be installed at the muzzle of the gun barrel. This cartridge is installed in the chamber of the weapon and, when the firing pin strikes the cartridge, a mechanism activates the laser marking to enable the marksman to see the point of arrival that the bullet would have had during firing. This firing detection and display mechanism must be duplicated for each type of weapon with which the marksman wishes to train. This firing-detection display mechanism is furthermore not suitable for long-distance firing (no firing deviation), nor for use in a virtual environment.

It is desirable to overcome these various drawbacks in the prior art. It is thus desirable to provide a solution that enables training marksmen in a virtual environment, leaving them the possibility of using their normal rifle. It is also desirable to provide a solution that is independent of the type of rifle normally used by the marksman. It is also desirable to provide a solution that is simple to implement at low cost.

SUMMARY OF THE INVENTION

The invention relates to a firing-simulation scope configured to be installed on a rifle, including a first inertial measurement unit, a windage correction adjustment device, an electronic system, a microphone, a display and a connection interface for connection to a control station. The firing-simulation scope being such that the electronic system includes: means for receiving, via the connection interface, video data representing a field of view, through a simulated scope, in the virtual environment; means for displaying on the display the received video data; means for obtaining an audio recording made in real time by the microphone; means for comparing the audio recording with a predetermined firing-triggering signature with the rifle; and means for transmitting, to the control station via the connection interface, when the audio recording matches the predetermined signature, a firing triggering detection signal associated with inertial measurements supplied by the first inertial measurement unit and with a first adjustment setting supplied by the windage correction adjustment device, so as to enable the control station to determine a firing trajectory in the virtual environment. Thus, due to the microphone and the comparison with the predefined signature, it is possible to detect a firing made in the course of simulation by the soldier with his weapon normally used in operation. The first inertial measurement unit enables, easily and at least cost, to detect the axis of sight of the rifle, even when the latter is the weapon normally used in operation by the soldier in question.

According to a particular embodiment, the firing-simulation scope further includes a device for adjusting correction of the bullet drop, and the firing triggering detection signal is further associated with a second adjustment setting supplied by the bullet drop correction adjustment device, so as to enable the control station to take account thereof in order to determine the firing trajectory in the virtual environment. Thus, long-distance firings (greater than 300 meters) can be simulated.

According to a particular embodiment, the firing-simulation scope is such that the electronic system includes means for making an audio recording of a dry-firing triggering with the rifle and means for defining the signature from the audio recording of the dry-firing triggering. Thus, it is easy to define a signature particularly suited to the rifle actually used in simulation.

According to a particular embodiment, the firing-simulation scope is such that the electronic system includes means for making a frequency transposition of the audio recording, and the predetermined signature is a spectral signature. Thus, the comparison with the signature is facilitated and efficient (low rate of false detections of firing triggering).

According to a particular embodiment, the firing-simulation scope further includes a second inertial measurement unit, and the electronic system includes means for refining the inertial measurements supplied by the first inertial measurement unit by virtue of inertial measurements supplied by the second inertial measurement unit, the first inertial measurement unit being configured in data fusion mode and the second inertial measurement unit being configured in raw data mode. Thus, the determination of the axis of sight of the rifle is finer.

The invention also relates to a simulation system including at least one control station and at least one firing-simulation scope according to any of the embodiments mentioned above, each simulation scope being connected to one control station, each control station including means for determining the firing trajectory in the virtual environment, when the control station receives the firing triggering detection signal from one simulation scope that is connected thereto.

According to a particular embodiment, each control station includes at least one set of firing tables providing, according to a distance travelled by a simulated bullet, firing deviation data further according to wind force and direction, and the means for determining the firing trajectory in the virtual environment include: means for determining a position of the soldier in simulation in the virtual environment at the moment of the firing triggering; means for determining the axis of sight of the rifle by virtue of the inertial measurements associated with the firing triggering detection signal; means for laterally correcting the axis of sight of the rifle by the first adjustment setting; and means for applying the deviation data specified in the set of firing tables. Thus, by way of the firing tables, the simulation is particularly realistic, the firing tables being able to be adapted according to field feedback.

According to a particular embodiment, each set of firing tables supplies, according to a distance travelled by a simulated bullet, bullet-drop data, the simulation scope comprises a bullet-drop correction adjustment device, the firing triggering detection signal is further associated with a second adjustment setting supplied by the bullet-drop correction adjustment device, and the means for determining the firing trajectory in the virtual environment further include means for correcting the axis of sight of the rifle for elevation by way of the second adjustment setting.

According to a particular embodiment, each set of firing tables supplies, according to a distance travelled by a simulated bullet, bullet-drop data according to an ambient temperature and an atmospheric pressure in the simulated environment. Thus, for long-distance firings (greater than 300 meters), the simulation is more realistic.

According to a particular embodiment, the position of the soldier in simulation in the virtual environment is fixed by applying a predefined offset with respect to an avatar of an observer accompanying the simulated soldier in the virtual environment. Thus, the simulation of a sniper-spotter operational pair is more realistic.

The invention also relates to a method implemented by a firing-simulation scope that is installed on a rifle and includes an inertial measurement unit, a device for adjusting windage correction, an electronic system, a microphone, a display and a connection interface for connection to a control station, the method being such that the electronic system performs the following steps: receiving, via the connection interface, video data representing a field of view, through a simulated scope, in the virtual environment; displaying on the display the received video data; obtaining an audio recording made in real time by the microphone; comparing the audio recording with a predetermined signature of firing triggering with the rifle; and transmitting to the control station via the connection interface, when the audio recording matches the predetermined signature, a firing triggering detection signal associated with inertial measurements supplied by the inertial measurement unit and with an adjustment setting supplied by the windage correction adjustment device, so as to enable the control station to determine a firing trajectory in the virtual environment.

The invention also relates to a method implemented by a simulation system including at least one control station and at least one firing-simulation scope implementing the method mentioned above, each simulation scope being connected to one control station, the method implemented by the simulation system being such that each control station determines the firing trajectory in the virtual environment, when the control station receives the firing triggering detection signal from one simulation scope that is connected thereto.

BRIEF DESCRIPTION OF THE DRAWINGS

The features of the invention mentioned above, as well as others, will emerge more clearly from a reading of the following description of an example embodiment, the description being given in relation to the accompanying drawings, among which.

DETAILED DESCRIPTION OF THE PREFERRED EMBODIMENTS

Figure 1:
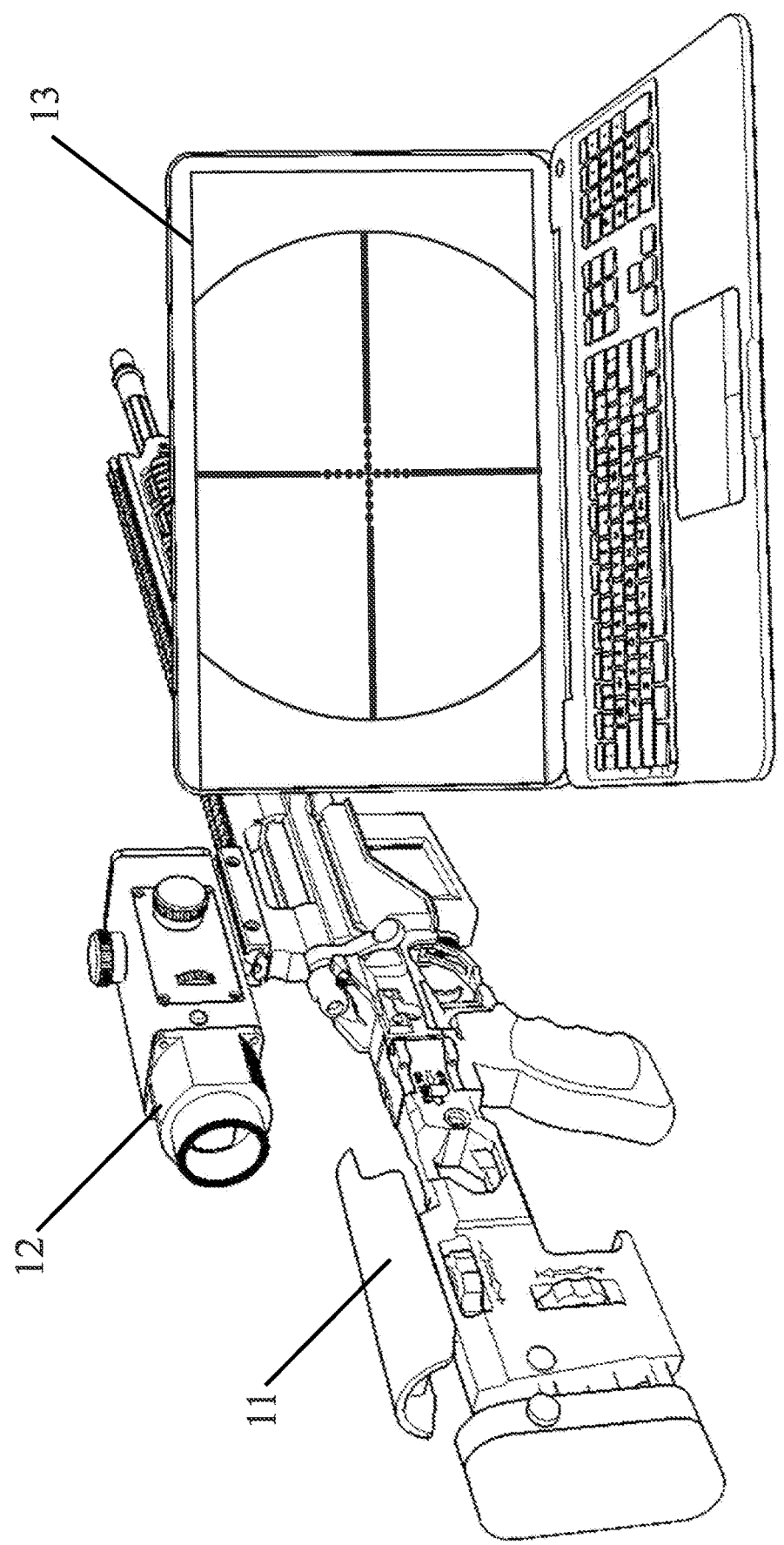
FIG. 1 illustrates schematically a simulation system in which the present invention is implemented.

FIG. 1 illustrates schematically a simulation system in which the present invention is implemented. The simulation system in FIG. 1 includes a control station 13, a rifle 11 and a simulation scope 12.

The control station 13 implements a simulation game suitable for training soldiers, by reconstituting an environment particular to the operational combat field of these soldiers. A "serious game" is generally spoken of The rifle 11 may be a dummy rifle dedicated to the simulation.

The rifle 11 is, however, preferentially the service weapon, unloaded, of the soldier in simulation. This allows putting the soldier in question in simulation conditions as close as possible to the reality on the ground. The rifle 11 is equipped with the simulation scope 12. The simulation scope 12 is in replacement for a scope normally used by the soldier in operation with the rifle 11. The simulation scope 12 is provided with a standard fixing mechanism 23, for example of the Picatinny rail type, allowing mounting on a large variety of rifles used by the soldiers in operation.

The control station 13 is therefore configured to generate a virtual environment, preferentially at 360°, with which a soldier in simulation shall interact in order to fulfil a given mission. The control station 13 preferentially includes a screen and one or more input peripherals (keyboard, mouse, etc.) to enable an instructor, responsible for checking the progress of the simulation, respectively to follow what is viewed by the soldier in simulation via the simulation scope 12 and to enter simulation parameters in order to define, or even to modify, the mission to be fulfilled by the soldier in simulation or the conditions of the mission. These simulation parameters are, more particularly, the type of simulated rifle, the type of simulated scope, the type of simulated munitions, the ambient temperature, the atmospheric pressure and the wind direction and force. These parameters have, in fact, an influence on the trajectory of a firing with the rifle. Other simulation parameters may also be modified in this way, such as, for example, the scenario of the mission (number of targets, the respective positions thereof at a given moment in the virtual environment, the movements thereof and the interaction thereof with each other and the soldier in simulation, etc.). The hardware architecture of the control station 13 is therefore based, for example, on a PC (personal computer) or a tablet or any other machine having processing resources enabling to generate the virtual environment. The control station 13 thus includes an electronic system 350 that comprises one or more electronic boards equipped with components. Let us consider hereinafter, non-limitatively, that the electronic system 350 comprises one electronic board.

The simulation scope 12 enables the soldier to be immersed in the virtual environment. The simulation scope 12 is illustrated schematically in FIG. 2. Apart from the aforementioned standard fixing mechanism 23, the simulation scope 12 includes: an electronic system 300 (not shown in FIG. 2); a display 21; a microphone 22; a light emitting diode 24; a windage correction knob 25; a zoom definition knob 26; a bullet drop correction knob 27; an inertial measurement unit IMU 314 (not shown in FIG. 2); and a connection interface 28.

The electronic system 300 comprises one or more electronic boards equipped with components. Let us consider hereinafter, non-limitatively, that the electronic system 300 comprises one electronic board.

The electronic board 300 is suitable for transmitting video data to be displayed in real time by the display 21, in order to receive audio recordings made in real time by the microphone 22, for controlling the light emitting diode 24, for receiving an adjustment of the windage correction knob 25, for receiving an adjustment of the zoom definition knob 26, for receiving an adjustment of the bullet drop knob 27, for receiving inertial measurements from the inertial measurement unit IMU 314, and for exchanging with the control station 13 via the connection interface 29. The electronic board 300 may use a self-contained power source of the simulation scope 12 or, in a variant, use a power source supplied by the control station 13 via the connection interface 28 (according to the technology used to implement the connection interface 28).

The connection interface 28 is thus configured to connect the simulation scope 12 to the control station 13. The connection interface 29 is, for example, of the USB (Universal Serial Bus) type and/or of the HDMI (High-Definition Multimedia Interface) type. The connection interface 28 may be in accordance with another wired communication technology, for example of the Ethernet type, and/or a wireless communication technology, for example of the Wi-Fi type. The connection interface 28 shall be suitable for enabling the control station 23 to transmit in real time a video data stream to be displayed by the display 21 of the simulation scope 12.

The light emitting diode 24 is optional. The light emitting diode 24 may allow the electronic board 300 to supply various indications, for example to indicate that the connection with the control station 13 is operational, that a firing has been detected by the electronic board 300, or that the calibration of the inertial measurement unit IMU 314 is under way.

The bullet drop connection knob 27 is also optional. Indeed, there exist simulation games suited to short-distance firings, such as, for example, games simulating objectives situated at less than 300 meters from the soldier. The bullet drop may then be ignored in such simulation games.

The inertial measurement unit IMU 314 is configured to supply inertial measurements, more particularly the Eulerian angles, representing the axis of sight of the rifle 11.

The display 21 is configured to display a portion of the virtual environment.

The displayed portion depends, in particular, on the axis of sight as, in particular, defined by the inertial measurements of the inertial measurement unit IMU 314. Indeed, the soldier in simulation is considered to be placed at a predetermined position in the virtual environment, as is an avatar in any simulation game. The position of this avatar may moreover be defined by applying a spatial offset predefined with respect to the position of another avatar in the virtual environment, such as, for example, a spotter accompanying the soldier on the mission. The spotter may be simulated on a supplementary control station, synchronized, for example, by way of a server, with the control station 13, as in a network multi-player gaming mode, also called "netplay". The number of control stations for a simulation is not limited. The sniper may thus be integrated in a group of several tens of soldiers. When the avatar of the spotter, the position of which serves as a reference for the avatar of the soldier in simulation with the rifle 11, moves in the virtual environment for tactical reasons, the position of the avatar of the soldier in simulation with the rifle 11 is updated. A field of view FOV of the soldier in simulation via a scope simulated by the simulation scope 12 is defined consistently with the field of view that the soldier would have on the ground with a real scope (the one that is simulated), by applying a zoom factor defined by the adjustment of the zoom definition knob 26. Any adjustment action carried on the windage correction knob 25 moves the field of view laterally according to an angle proportional to the performed adjustment action. Any adjustment action performed on the bullet drop correction knob 27 moves this field of view vertically through an angle proportional to the performed adjustment action. It should be noted that the simulation scope does not move, nor does the axis of sight of the rifle 11, only the field of view via the display 21. This field of view FOV thus defines the virtual environment portion displayed via the display 21. The video data for reproducing the portion of the environment to be displayed by the display 21 are transmitted to the simulation scope 12 by the control station 13. The display 21 is further configured to possibly display information concerning the adjustments made via the windage correction knob 25, the zoom definition knob 26, and the bullet drop correction knob 27. The display 21 is further configured to possibly display information concerning simulated atmospheric conditions. The display 21 is further configured to possibly display information concerning munitions used in simulation. This aspect is detailed below in relation to FIGS. 5 and 7B.

The inertial measurement unit IMU 314 may be calibrated once and for all vis-à-vis the magnetometer included in the inertial measurement unit IMU 314 by making "8" shapes in various directions with the simulation scope 12 (optionally mounted on the rifle 11). This procedure is found in the calibration of smailphone magnetometers. This enables taking into account the effects of the terrestrial magnetic field or magnetic interference present in the physical environment in which the soldier in simulation moves during the simulation. A complementary calibration may be applied, at the start of each simulation. The rifle 11, equipped with the simulation scope 12, may be placed on the ground in order to define a reference elevation. The calibration is triggered by the control station 13, which instructs the electronic board 300 accordingly, in order to reinitialize the Eulerian angles on the quaternions corresponding to the height of the inertial measurement unit IMU 314 in space. The reinitialization of the Eulerian angles or of the quaternions marks a reference direction, which is given by the actual axis of the field of view of the avatar representing the soldier in simulation (for example, a default axis: as in any video game in POV (Point of View) mode, the game sequence commences on a default avatar field-of-view axis) or by the field-of-view axis of the aforementioned spotter (for example, also a default axis).

The microphone 22 is configured to record ambient noise for the purpose of enabling the detection of a dry-firing triggering made by the soldier in simulation with the rifle 11. This aspect is detailed hereinafter in relation to FIG. 6. This requires a prior signature definition. One embodiment is detailed hereinafter in relation to FIG. 4.

Figure 2:
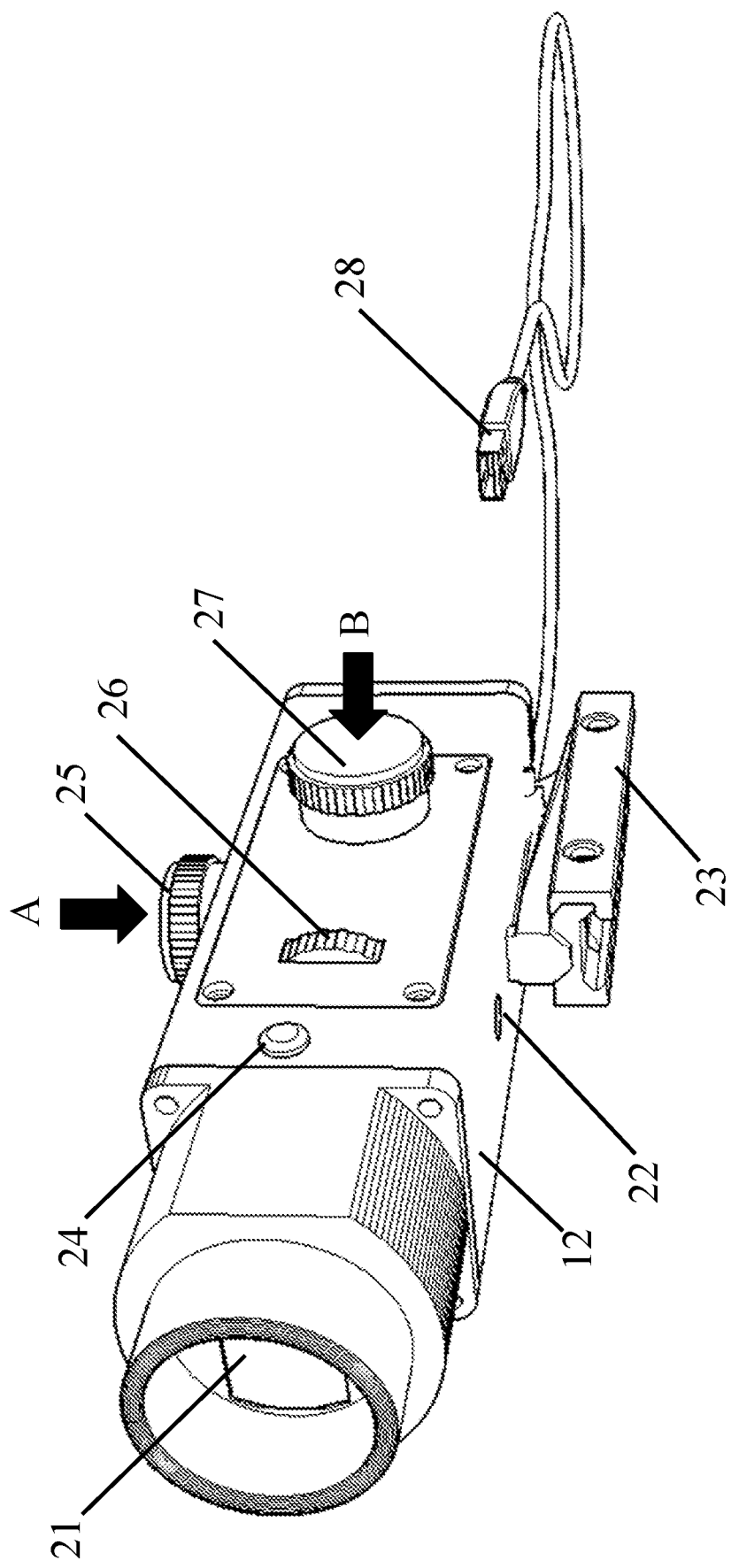
FIG. 2 illustrates schematically a simulation scope used in the system in FIG. 1.

As shown in FIG. 2, the microphone 22 is preferentially placed on the same side of the simulation scope 12 as the standard fixing mechanism 23. This enables the microphone 22 to best capture the sounds of dry-firing triggering performed by the soldier in simulation with the rifle 11. The position of the microphone 22 may be adapted differently to improve the proximity of the microphone 22 with the firing-triggering mechanism on the rifle 11, in order to best capture the sound and to improve detection.

The adjustments made by the soldier in simulation by way of at least of the windage correction knob 25 and optionally by way of the bullet drop correction knob 27, as well as the axis of sight defined, in particular, by the inertial measurements of the inertial measurement unit IMU 314, at the moment of detection of the dry-firing triggering, are analyzed in order to validate the firing or not. This aspect is detailed hereinafter in relation to FIGS. 7A and 7C.

In a particular embodiment, the inertial measurement unit IMU 314 is supplemented by another inertial measurement unit IMU configured to be placed on the barrel of the rifle 11. This other inertial measurement unit IMU is installed in a housing separate from the rest of the simulation scope 12, the housing being mounted on the rifle 11 by way of a standard fixing mechanism, for example of the Picatinny rail type (current rifles are equipped with this type of rail practically all along the barrel). The electronic system of the simulation scope 12 may thus be distributed between the two housings, each having potentially its own connection interface with the control station 13. The inertial measurement unit IMU 314 is configured in "data fusion" mode (a low-frequency operating mode that is conventionally found in inertial measurement units on a rack) so as to detect rough movements of change of axis of sight of the rifle 11, and the other inertial measurement unit IMU is configured in "raw data" mode (a high-frequency operating mode that is also found conventionally in inertial measurement units on a rack) in order to detect fine movements of change of axis of sight of the rifle, for example related to the breathing of the soldier in simulation. The inertial measurement unit IMU 314 and this other inertial measurement unit IMU have sensitivities over complementary measurement ranges, to enable the electronic board 300 to refine the inertial measurements of the inertial measurement unit IMU 314, e.g., the Eulerian angles, by those of this other inertial measurement unit IMU. This other inertial measurement unit IMU is connected to the electronic board 300, for example by way of a serial connection or a USB cable, so that the electronic board 300 can process the inertial measurements that come therefrom. This other inertial measurement unit IMU is calibrated at the same time as the inertial measurement unit IMU 314 and in the same way.

Figure 3A:
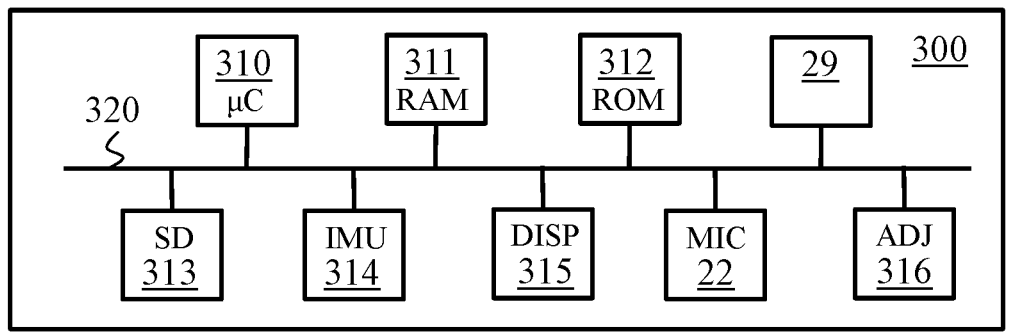
FIG. 3A illustrates schematically an example of hardware architecture of an electronic board included in the simulation scope.

FIG. 3A illustrates schematically an example of hardware architecture of the electronic board 300 included in the simulation scope 12.

The electronic board 300 then includes, connected by a communication bus 320: a processor or microprocessor μC 310; a static random access memory SRAM 311; a Flash memory (not shown); a read only memory (ROM) 312 of the EEPROM type (Electrically Erasable Programmable Read Only Memory); the connection interface 29; a storage unit or an information storage medium reader 313, such as a SD (Secure Digital) card reader; the inertial measurement unit IMU 314; a communication interface DISP 315 suitable for communicating with the display 21; a communication interface MIC 316 suitable for communicating with the microphone 22; and a set ADJ 316 of communication interfaces suitable for communicating respectively with the windage correction knob 25, with the zoom definition knob 26 and with the bullet drop correction knob 27.

The microprocessor μC 310 is capable of executing instructions loaded into the random access memory SRAM 311 from the FLASH memory and/or from the read only memory EEPROM 312, or from an external memory, or from a storage medium, or from a communication network. When the electronic board 300 is powered up, the microprocessor μC 310 is capable of reading instructions from the random access memory SRAM 311 and executing them. These instructions form a computer program causing implementation, by the microprocessor μC 310, of all or some of the algorithms and steps described hereinafter in relation to the simulation scope 12.

All or some of the algorithms and steps described hereinafter in relation to the simulation scope 12 may thus be implemented in software form by execution of a set of instructions by a programmable machine, for example a digital signal processor DSP or a microprocessor.

In a variant, all or some of the algorithms and steps described hereinafter in relation to the simulation scope 12 may be implemented in hardware form by a machine or a dedicated chip or a dedicated chipset, such as, for example, an FPGA (field-programmable gate array) chip or an ASIC (application-specific integrated circuit) chip.

Figure 3B:
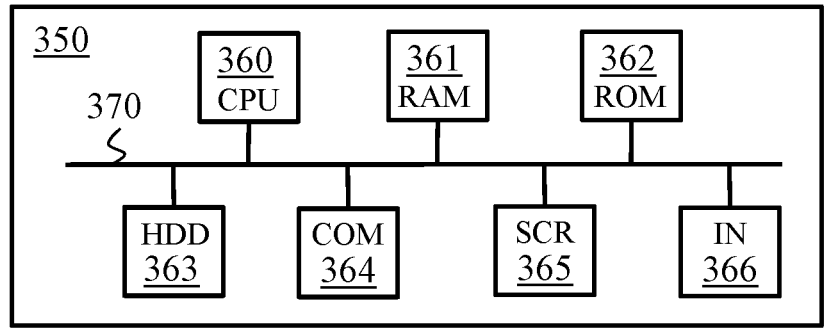
FIG. 3B illustrates schematically an example of hardware architecture of an electronic board included in a control station of the system in FIG. 1.

FIG. 3B illustrates schematically an example of hardware architecture of the electronic board 350 included in the control station 13.

The electronic board 350 then includes, connected by a communication bus 370: a processor CPU (central processing unit) 360; a random access memory RAM 361; a read only memory ROM 362; a storage unit, such as a hard disk drive HDD, or an information storage medium reader 363; a communication interface COM 364 suitable for communicating with the simulation scope 12; a communication interface SCR 365 suitable for communicating with the screen of the control station 13; and a communication interface IN 366 suitable for communicating with the input peripheral(s) of the control station 13.

The processor CPU 360 is capable of executing instructions loaded into the random access memory RAM 361 from the read-only memory ROM 362, or from an external memory, or from a storage medium, or from a communication network. When the electronic board 350 is powered up, the processor CPU 360 is capable of reading instructions from the random access memory RAM 361 and executing them. These instructions form a computer program causing implementation, by the processor CPU 360, of all or some of the algorithms and steps described hereinafter in relation to the control station 13.

All or some of the algorithms and steps described hereinafter in relation to the control station 13 may thus be implemented in software form by execution of a set of instructions by a programmable machine, for example a digital signal processor DSP or a microcontroller.

In a variant, all or some of the algorithms and steps described hereinafter in relation to the control station 13 may be implemented in hardware form by a machine or a dedicated chip or a dedicated chipset, such as for example a FPGA chip or a ASIC chip.

Figure 4:
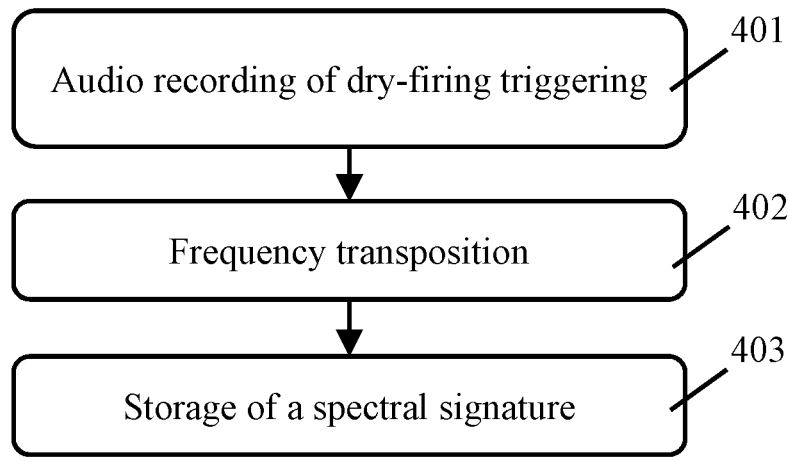
FIG. 4 illustrates schematically an algorithm for initializing a dry-firing triggering detection mechanism included in the simulation scope and implemented by way of the electronic board included in the simulation scope.

FIG. 4 illustrates schematically an algorithm for initializing the dry-firing triggering detection mechanism included in the simulation scope 12 and implemented by way of the electronic board 300. The algorithm in FIG. 4 aims to enable the simulation scope 12 to build a dry-firing triggering signature suited to the rifle 11 to which the simulation scope 12 is fixed. The algorithm in FIG. 4 is executed on instruction from the control station 13, via the connection interface 29, before immersing the soldier in the virtual environment.

In a step 401, the simulation scope 12 makes, by way of the microphone 22, an audio recording of a dry-firing triggering performed with the rifle 11. It is preferable during this operation to limit ambient noise so that the audio recording contains in substance only the dry-firing triggering in question. Activation of the microphone 22 to start the audio recording and deactivation of the microphone 22 to stop the audio recording are triggered on instruction from the control station 13, via the connection interface 29.

In a step 402, the simulation scope 12 makes a frequency transposition of the audio recording made at step 401. A fast Fourier transform FFT is preferentially implemented to do so, for example using the Cooley-Tukey algorithm. This transposition in the frequency domain of the audio recording defines a spectral signature representing a dry-firing triggering made with the rifle 11.

In a step 403, the simulation scope 12 stores the spectral signature thus defined, so as to enable subsequently recognizing a dry-firing triggering made with the rifle 11 under simulation conditions, as described hereinafter in relation to FIG. 6.

Figure 5:
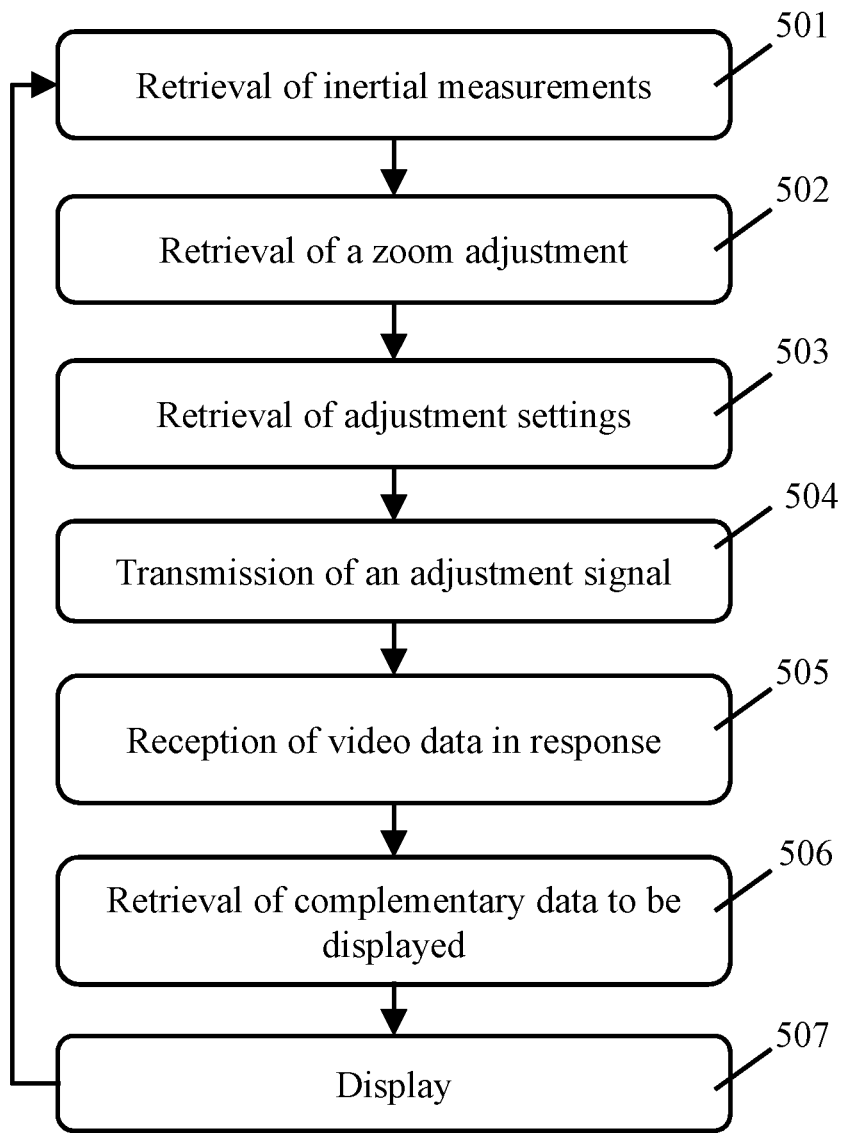
FIG. 5 illustrates schematically an algorithm, implemented by way of the electronic board included in the simulation scope, for managing a display included in the simulation scope.

FIG. 5 illustrates schematically an algorithm, implemented by the simulation scope 12 by way of the electronic board 300, for managing the display 21.

In a step 501, the electronic board 300 recovers inertial measurements from the inertial measurement unit IMU 314, and optionally from the other inertial measurement unit IMU mentioned in relation to FIG. 2. In a particular embodiment, these inertial measurements are the Eulerian angles or the quaternions corresponding to the attitude of the rifle 11 in space.

In a step 502, the electronic board 300 recovers zoom adjustment information, as defined by the zoom definition knob 26.

In a step 503, the electronic board 300 recovers windage correction adjustment information, as defined by the windage correction knob 25. Preferentially, the electronic board 300 retrieves bullet drop correction adjustment information, as defined by the bullet drop correction knob 27. These adjustments form adjustment settings with respect to the axis of sight of the rifle 11 defined by the position of the avatar representing the soldier in simulation in the virtual environment (or by predefined offset with respect to the position of an avatar representing the spotter) and by the field-of-view axis of the soldier in simulation in the virtual environment, namely the reference axis obtained by the calibration of the inertial measurement unit IMU 314 (and optionally of the other inertial measurement unit mentioned in relation to FIG. 2) and then modified according to the inertial measurements supplied by the inertial measurement unit IMU 314 (and optionally by the other inertial measurement unit mentioned in relation to FIG. 2).

In a step 504, the electronic board 300 transmits to the control station 13 an adjustment signal including the inertial measurements retrieved at the step 501, the zoom adjustment information retrieved at the step 502, the windage correction adjustment information retrieved at the step 503 and the bullet drop correction adjustment information optionally retrieved at the step 503. As described hereinafter in relation to FIG. 7B, this information enables the control station 13 to define video data to be displayed by the display 21.

In a step 505, the electronic board 300 receives from the control station 13 these video data to be displayed by the display 21.

In a step 506, the electronic board 300 determines whether complementary data are to be displayed superimposed on the video data supplied by the control station 13 and retrieves the complementary data if applicable. These complementary data are, for example, the zoom adjustment information retrieved at the step 502, the windage correction adjustment information optionally retrieved at the step 503 and the bullet drop correction adjustment information optionally retrieved at the step 503. These complementary data are further, for example, information representing munitions used in simulation. These complementary data are further, for example, information relating to the simulated atmospheric conditions (temperature, pressure, and wind direction and force). The electronic board 300 preferentially determines which complementary data are to be displayed, according to configuration instructions transmitted by the control station 13. These configuration instructions are typically defined by the instructor responsible for checking the progress with the simulation. In a variant, the display of some information superimposed on the video data is decided by the soldier in simulation. For example, the soldier in simulation may decide to thus display the windage correction adjustment information optionally retrieved at the step 503, by pressing on the windage correction knob 25 (as shown by the arrow A in FIG. 2), and the soldier in simulation may decide to thus display the bullet drop correction adjustment information optionally retrieved at the step 503, by pressing on the bullet drop correction knob 27 (as shown by the arrow B in FIG. 2).

In a step 507, the electronic board 300 transmits to the display 21, for display, the video data received at the step 505, and configures the display 21 in order to display by superimposition any complementary data identified at the step 506. The display by superimposition takes place, for example, in accordance with a technique of the OSD (on-screen display) type, as used in the display of menus of consumer electronic devices with a screen. If the reticle inherent in shooting scopes is not directly shown in the video data transmitted by the control station 13 to the electronic board 300, this reticle may be added by superimposition by the electronic board 300. An example of rendition on the display 21 is illustrated schematically in FIG. 8.

Figure 6:
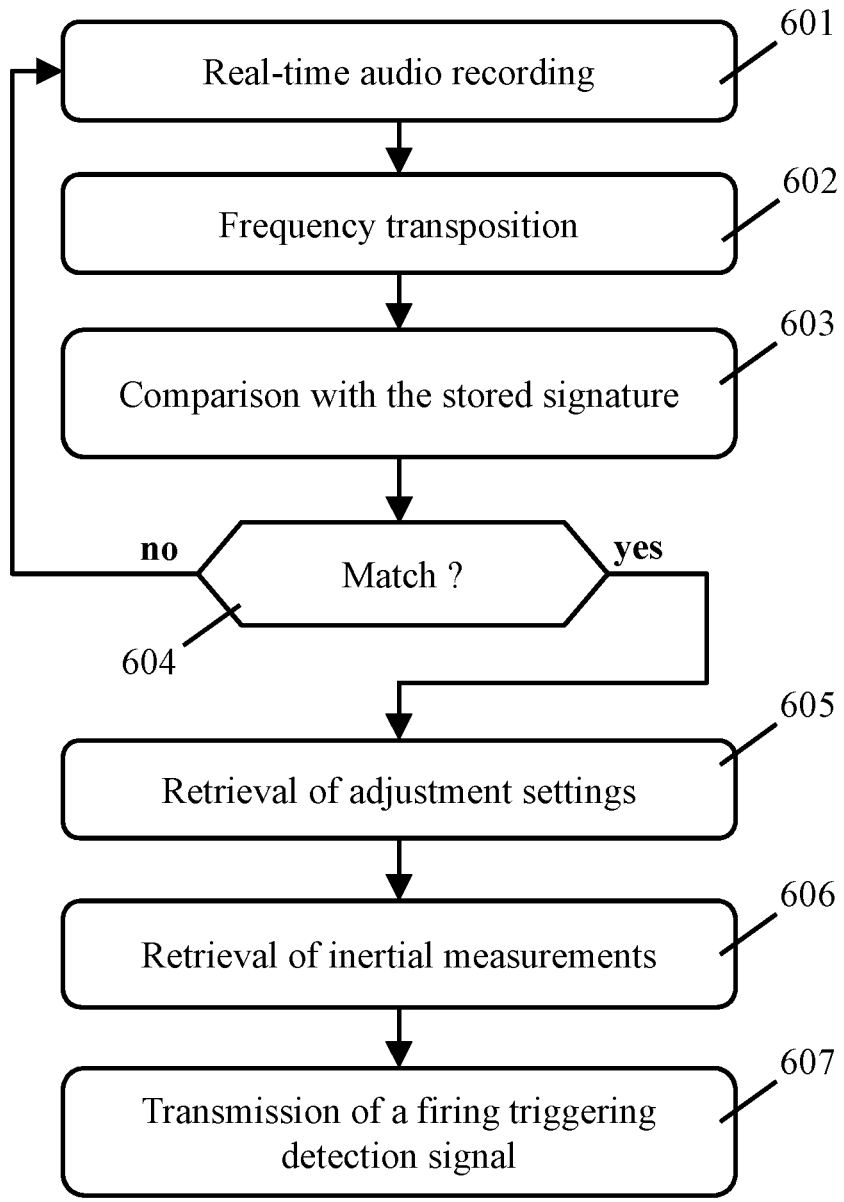
FIG. 6 illustrates schematically an algorithm, implemented by way of the electronic board included in the simulation scope, for implementing the dry-firing triggering detection mechanism.

FIG. 6 illustrates schematically an algorithm, implemented by the simulation scope 12 by way of the electronic board 300, for implementing the dry-firing triggering detection mechanism.

In a step 601, the electronic board 300 makes, by way of the microphone 22, a real-time audio recording of the ambient noise, during simulation.

In a step 602, the electronic board 300 performs a frequency transposition of the audio recording. A fast Fourier transform FFT is preferentially implemented to do so, as in the context of the step 402.

In a step 603, the electronic board 300 makes a comparison of the frequency transposition carried out at the step 602 with a pre-established dry-firing triggering signature for the rifle 11. This signature may be a pre-established model. For example, the control station 13 has a library of signatures for a set of respective rifle models, and the electronic board 300 receives the signature in question from the control station 13, typically following a configuration carried out by the instructor responsible for checking the progress of the simulation. This signature may also be obtained by the electronic board 300 as already described in relation to FIG. 4, which may also moreover allow populating the aforementioned library for subsequent simulations.

In a step 604, the electronic board 300 checks whether there is a match between the frequency transposition carried out at the step 602 and the signature in question. In other words, the electronic board 300 carries out a search for frequency correlation between the frequency transposition carried out at the step 602 and the signature in question, with a probability level above a predefined threshold. If there is a match, a dry-firing triggering performed with the rifle 11 under simulation conditions is detected and a step 605 is performed; otherwise step 601 is reiterated.

In the step 605, the electronic board 300 retrieves adjustment setting information with respect to the axis of sight of the rifle 11 defined by the inertial measurements. As already mentioned in relation to FIG. 5, these adjustments correspond to those made via the windage correction knob 25 and optionally via the bullet drop correction knob 27.

In a step 606, the electronic board 300 retrieves the inertial measurements so as to allow knowing the axis of sight of the rifle 11 in the virtual environment.

In a step 607, the electronic board 300 transmits to the control station 13 a firing triggering detection signal including the inertial measurements included at the step 606, the windage correction adjustment information retrieves at the step 605 and the bullet-drop correction adjustment information optionally retrieved at the step 605. As described below in relation to FIG. 7C, this information enables the control station 13 to determine whether or not the triggering is valid. The step 601 is next reiterated.

Another approach for recognizing a dry-firing triggering carried out with the rifle 11 under simulation conditions is to seek a temporal correlation between the audio recording made by the microphone 22 during simulation and an audio recording of a dry-firing triggering made with the rifle 11 prior to the simulation. The correlation search then takes place directly using the audio recording made by the microphone 22 during simulation, without passing through a spectral transposition. The correlation search comprises determining whether, at a given instant (or rather over a given period, since the firing triggering is not instantaneous), the audio recording made in simulation by the microphone 22 corresponds to the audio recording made prior to the simulation, with a level of probability higher than a predefined threshold. The correlation search then takes place by way of a specific filter, called a "matched filter", also called a "North filter". The matched filter is then formed on the basis of the audio recording made prior to the simulation, reversed in time. The use of such a filter enables maximizing the signal-to-noise ratio, considering, in particular, that the audio recording made in simulation by the microphone 22 may include ambient noise not present in the audio recording made prior to the simulation.

It should be noted that the windage correction adjustment information, the bullet-drop correction adjustment information and the zoom adjustment information may be transmitted by the electronic board 300 in a process independent of the algorithms in FIGS. 5 and/or 6 (for example by transmission of a dedicated signal whenever an adjustment modification is made), and in which case the adjustment signal of the algorithm in FIG. 5 and/or the firing triggering signal in FIG. 6 do not need to include such information. The control station 13 is then, in fact, able to determine which adjustments have been made by the soldier in simulation at the time of reception of the adjustment signal from the algorithm in FIG. 5 and/or of the firing triggering signal in FIG. 6.

Figure 7A:
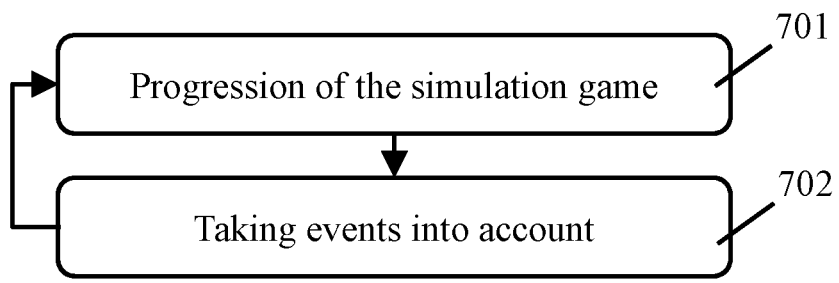
FIG. 7A illustrates schematically an algorithm, implemented by way of the electronic board included in the control station, for implementing a simulation game.

FIG. 7A illustrates schematically an algorithm, implemented by the control station 13 by way of the electronic board 350, for implementing a simulation game.

In a step 701, the electronic board 350 progresses a simulation game according to a predetermined mission scenario. Typically, the scenario of the mission (number of targets, the respective positions thereof at a given moment in the virtual environment, etc.) is configured by the instructor responsible for monitoring the simulation.

In a step 702, the electronic board 350 takes into account events modifying the progress of the simulation game. For example, such events are changes in configuration made by the instructor responsible for monitoring the simulation. More particularly, such events are related to interaction of the soldier in simulation with the virtual environment, and, in particular, detections of firing triggering by the soldier in simulation. This aspect is detailed hereinafter in relation to FIG. 7C.

Figure 7B:
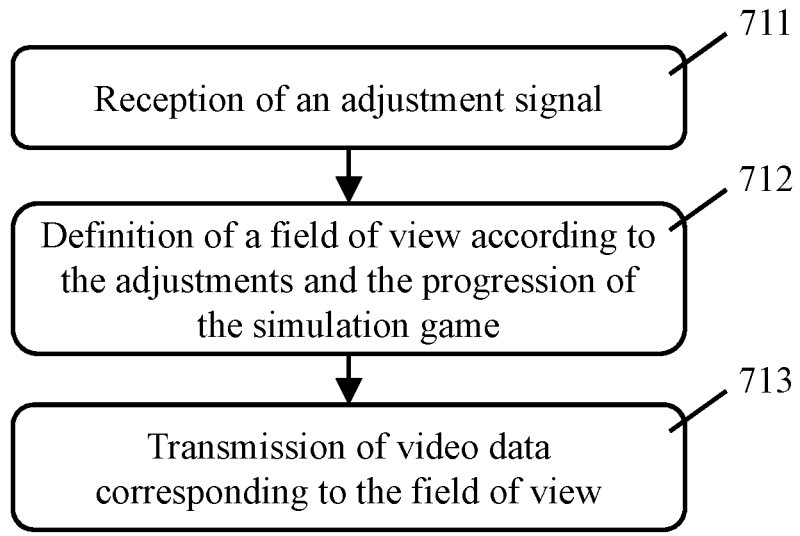
FIG. 7B illustrates schematically an algorithm, implemented by way of the electronic board included in the control station, for defining the video data to be supplied to the display included in the simulation scope.

FIG. 7B illustrates schematically an algorithm, implemented by the control station 13 by way of the electronic board 350, for defining video data to be supplied to the display 21.

In a step 711, the electronic board 350 receives an adjustment signal from the simulation scope 12, as mentioned in relation to FIG. 5.

In a step 712, the electronic board 350 defines a field of view for the avatar representing the soldier in simulation in the virtual environment. This field of view is defined according to predefined dimensions (i.e., frame):

taking as the central reference of the field of view the axis of sight of the rifle 11, as, in particular, defined by the inertial measurements;

adjusting the zoom, in the predefined dimensions, according to the adjustment action performed on the zoom definition knob 26;

laterally adjusting this central reference according to an angle proportional to the adjustment action performed on the windage correction knob 25;

optionally vertically adjusting this central reference at an angle proportional to the adjustment action performed on the bullet drop correction knob 27.

Figure 8:
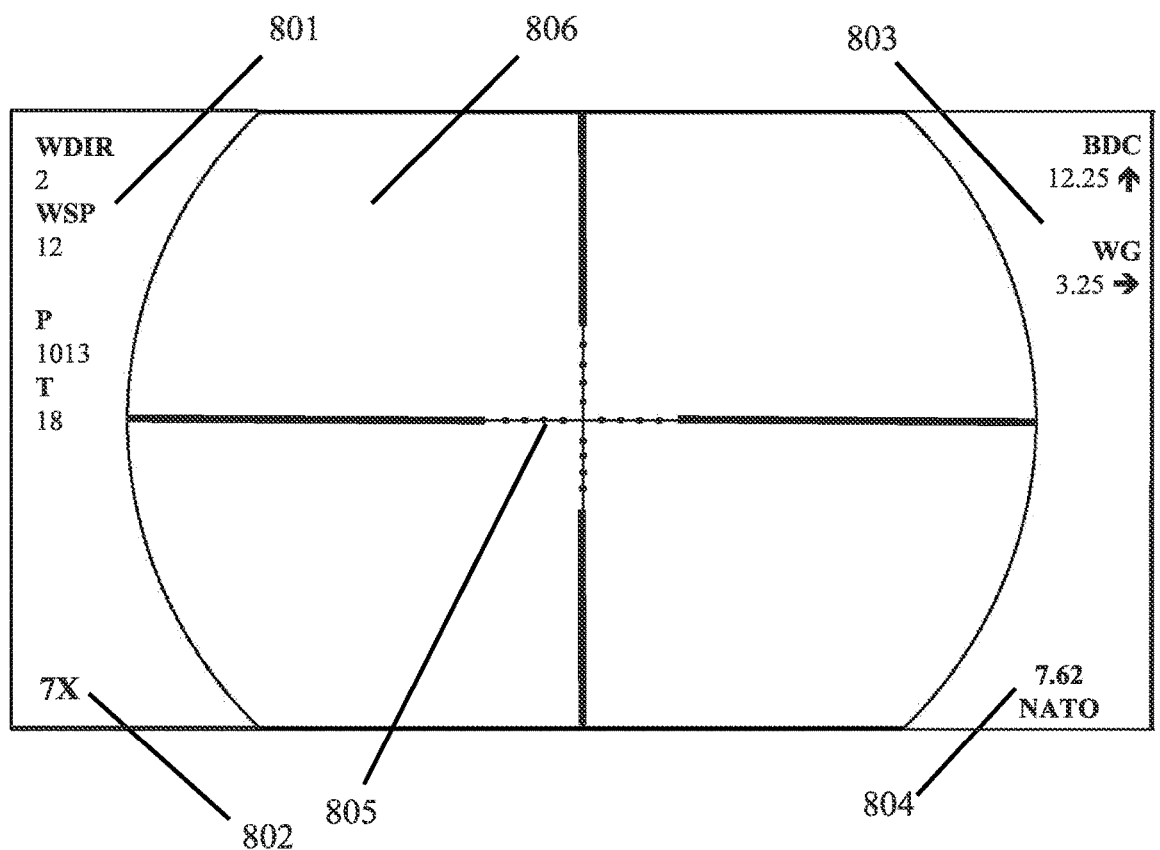
FIG. 8 illustrates schematically an example of a display rendition on the display included in the simulation scope.

In a step 713, the electronic board 350 transmits to the simulation scope 12, with a view to display by the display 21, video data on the virtual environment corresponding to the field of view defined at the step 712. These video data may include the representation of a reticle inherent in shooting scopes, as can be seen in FIG. 8.

Figure 7C:
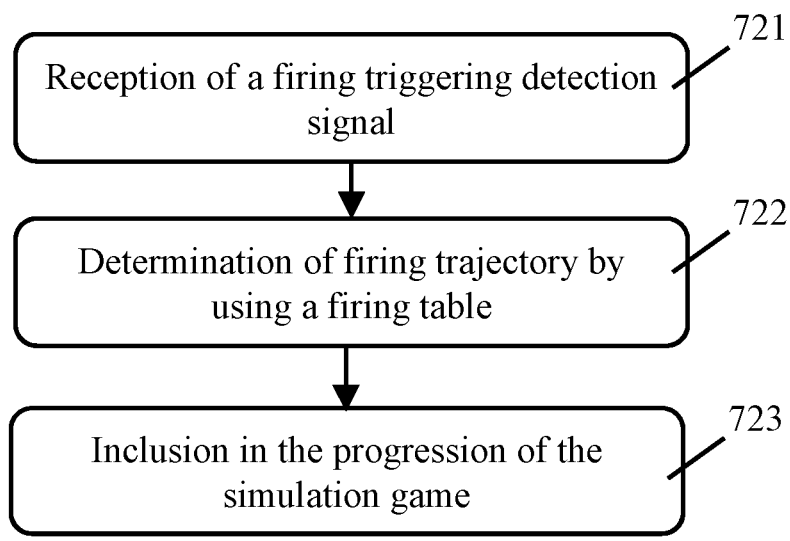
FIG. 7C illustrates schematically an algorithm, implemented by way of the electronic board, for checking a simulated firing.

FIG. 7C illustrates schematically an algorithm, implemented by the control station 13 by way of the electronic board 350, for verifying a simulated firing.

In a step 721, the electronic board 350 receives a firing-triggering detection signal from the simulation scope 12, as mentioned in relation to FIG. 6.

In a step 722, the electronic board 350 determines a firing trajectory in the virtual environment. The firing trajectory is determined by the position of the avatar representing the soldier in simulation in the virtual environment (or by predefined offset with respect to the position of an avatar representing the spotter) and the axis of sight of the rifle, corrected laterally by the windage adjustment and optionally corrected for elevation by the bullet drop correction adjustment. The electronic board 350 thus uses to do so a set of firing tables representing a model of deviation undergone by a bullet fired with the rifle 11. The set of firing tables provides, according to the distance travelled by a simulated bullet, firing deviation information according furthermore to wind force and direction and optionally bullet drop information. There typically exists a set of firing tables for each type of munition and rifle that can be used in simulation. One example of such a firing table is described hereinafter in relation to FIG. 9.

Each firing table is associated with a predefined distance (e.g. 1000 meters) or with a range of distances (e.g., from 900 to 1100 meters) and supplies firing deviation information according to wind force and direction. The unit generally used for representing a firing deviation is the minute of angle MOA or the angular thousandth mil used by artillery (a mil is equal to an angle representing one meter at a thousand meters). The direction of the wind is generally given according to a clock dial reference (at 12 o'clock, the wind comes front on; at 3 o'clock, the wind comes from 90° to the right; at 6 o'clock the wind comes from behind; at 9 o'clock the wind comes at 90° from the left). For different distances with the same type of munition and the same type of rifle, the deviation is different (the deviation increases with distance).

Each firing table may further provide bullet drop information according to the distance associated with the firing table.

Each firing table may further provide bullet drop information (or bullet drop braking) information according to the ambient temperature, as well as bullet drop information according to pressure.

Each firing table may further provide flight time information on the bullet for travelling the distance associated with the firing table.

The electronic board 350 thus determines the firing trajectory starting from the axis of sight of the rifle, from the position of the avatar of the soldier in simulation in the virtual environment, corrected laterally by the windage adjustment and optionally corrected for elevation by the bullet drop correction adjustment, and then applying the deviation data specified in the set of firing tables applicable.

When the adjustment settings perfectly compensate for the deviation data entered in the firing table applicable according to the distance of the target, the point of arrival of the bullet at the distance in question is the intersection of the reticle. When the adjustment settings do not perfectly compensate for the deviation data entered in the firing table applicable according to the distance of the target, the point of arrival of the bullet at the distance in question is offset with respect to the intersection of the reticle. This does not, however, mean that the firing has failed. Indeed, during a plurality of successive firings, the soldier in simulation may perform a first firing with rough adjustment settings by way of the windage correction knob 25 and bullet drop knob 27, see where the bullet arrives in the virtual environment, and adjust the following firing or firings with the help of the reticle at the reticle mil dots (which changes the axis of sight of the rifle 11). It should be noted moreover that the soldier in simulation typically also uses these mil dots for determining the distance with respect to the target in the virtual environment. Indeed, these mil dots are separated by a predefined distance in the reticle, typically one mil. Knowing the order of magnitude of the dimensions of the target, the soldier in simulation can therefore assess the distance of the target by using the mil dots.

In a step 723, the progress of the simulation game takes into account the trajectory of the firing thus determined. The point of arrival of the bullet is represented in the virtual environment by a special effect dependent typically on the munition used (larger or smaller cloud according to the caliber). The progress of the simulation game may take into account the flight time of the bullet in order to increase realism. The algorithm in FIG. 7C is ended. The representation of the firing may also depend on calculations of damage on the target, if the latter is touched by the firing. A model is used that depends on the nature of the target and the level of protection thereof, the munition simulated (munitions of a larger or smaller caliber, explosive or not) and the distance from the target with respect to the soldier in simulation in the virtual environment (speed on impact). If the target is not touched by the firing, statistical imprecision around the target may be used to make the firing more random in the progress of the simulation game. The algorithm in FIG. 7C is then ended.

FIG. 8 illustrates schematically an example of rendition of display on the display 21.

The rendition illustrated in FIG. 8 shows the field of view 806 resulting from the video data generated by the control station 13.

The rendition illustrated in FIG. 8 shows the reticle 805, with its mil dots, superimposed on the field of view 806. The control station 13 has the possibility of changing the type of reticle, which is often specific to each brand of scope.

The rendition illustrated in FIG. 8 shows a display of atmospheric conditions 801, superimposed, of a simulated wind direction WDIR (here at 2 o'clock) and of a simulated wind force WSP (here 12 km/h), as well as a simulated ambient temperature T (here 18° C.) and an atmospheric pressure P (1013 hPa).

The rendition illustrated in FIG. 8 shows an adjustment setting display 803, namely bullet drop correction BDC (here 12.25 towards the top) and windage correction WG (here 3.25 to the right).

The rendition illustrated in FIG. 8 shows a simulated-munition display 804.

Figure 9:
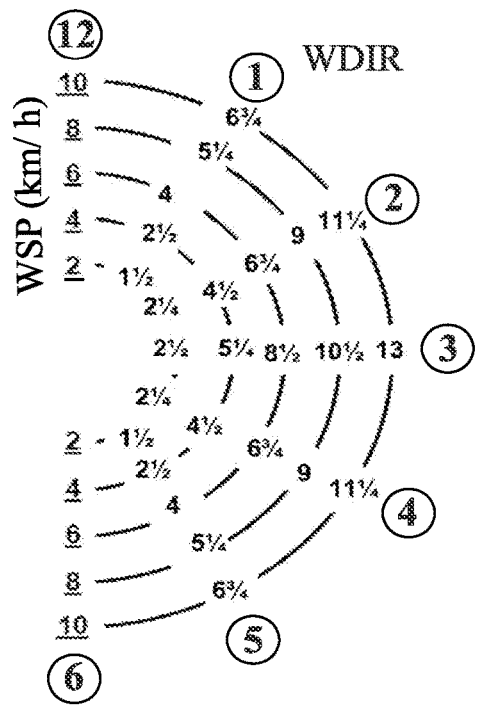
FIG. 9 illustrates schematically a firing table, used by the electronic board included in the control station, for checking a simulated firing.

FIG. 9 illustrates schematically a firing table used by the electronic board 350 for checking a simulated firing.

FIG. 9 shows on the left a first bullet drop correction table (correction given in minutes of angle on the right of the table) to be applied according to temperature levels (temperature levels indicated on the left of the table in ° C.). A positive bullet drop correction indicates a bullet drop braking (the bullet drops even at high ambient temperature because of the distance).

FIG. 9 shows, to the right of the first bullet drop correction table, a second bullet drop correction table (correction given in minutes of angle on the right of the table) to be applied according to atmospheric pressure levels (atmospheric pressure levels indicated on the left of the table in hPa).

FIG. 9 shows, underneath the first bullet drop correction table, a bullet drop correction related to the distance (here 1000 meters), and just alongside an indication of the flight time of the bullet for travelling the associated distance.

On the right of FIG. 9, a windage correction table according to the direction of the wind and the force of wind is shown. The circled indications represent the direction of the wind (only half of the clock reference is presented since the data are symmetrical). The force of the wind (in km/h) is indicated at the ends of the shown semicircles, and the correction to be applied is indicated on the semicircles for each predefined direction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A firing-simulation scope configured to be installed on a rifle comprising:
   a first inertial measurement unit,
   a windage correction adjustment device,
   an electronic system,
   a microphone,
   a display, and
   a connection interface for connection to a control station,
      the electronic system being configured to:
         receive, via the connection interface, video data representing a field of view, through a simulated scope, in a virtual environment;
         display, on the display, the received video data;
         obtain an audio recording made in real time by the microphone;
         compare the audio recording with a predetermined firing-triggering signature with the rifle; and
         transmit, to the control station via the connection interface, when the audio recording matches the predetermined firing-triggering signature, a firing triggering detection signal associated with inertial measurements supplied by the first inertial measurement unit and with a first adjustment setting supplied by the windage correction adjustment device, so as to enable the control station to determine a firing trajectory in the virtual environment.

2. The firing-simulation scope according to claim 1, further including a device for adjusting correction of bullet drop, and wherein the firing triggering detection signal is further associated with a second adjustment setting supplied by the device for adjusting correction of the bullet drop, so as to enable the control station to take account thereof for determining the firing trajectory in the virtual environment.

3. The firing-simulation scope according to claim 1, wherein the electronic system is further configured to make a second audio recording of a dry-firing triggering with the rifle, and wherein the electronic system is further configured to define the predetermined firing-triggering signature from the second audio recording.

4. The firing-simulation scope according to claim 1, wherein the electronic system is further configured to make a frequency transposition of the audio recording, and wherein the predetermined firing-triggering signature is a spectral signature.

5. The firing-simulation scope according to claim 1, further including a second inertial measurement unit, and wherein the electronic system is further configured to refine the inertial measurements supplied by the first inertial measurement unit by virtue of inertial measurements supplied by the second inertial measurement unit, the first inertial measurement unit being configured in data fusion mode and the second inertial measurement unit being configured in raw data mode.

6. A simulation system including the control station and the firing-simulation scope according to claim 1, the firing-simulation scope being connected to the control station, the control station including electronic circuitry to determine the firing trajectory in the virtual environment when said control station receives the firing triggering detection signal from the firing-simulation scope connected thereto.

7. The simulation system according to claim 6, wherein the control station includes at least one set of firing tables providing, according to a distance travelled by a simulated bullet, firing deviation data according further to wind force and direction, and wherein determining the firing trajectory in the virtual environment includes:
   determining a position of a soldier in simulation in the virtual environment at a moment of firing;
   determining an axis of sight of the rifle by virtue of the inertial measurements associated with the firing triggering detection signal;
   laterally correcting the axis of sight of the rifle by the first adjustment setting; and
   applying the deviation data specified in the at least one set of firing tables.

8. The simulation system according to claim 7, wherein the at least one set of firing tables supplies, according to the distance travelled by the simulated bullet, bullet-drop data, wherein the firing-simulation scope comprises a bullet-drop correction adjustment device, wherein the firing triggering detection signal is further associated with a second adjustment setting supplied by the bullet-drop correction adjustment device, and wherein the determining the firing trajectory in the virtual environment further includes correcting the axis of sight of the rifle for elevation by way of the second adjustment setting.

9. The simulation system according to claim 8, wherein the at least one set of firing tables supplies, according to the distance travelled by the simulated bullet, the bullet-drop data according to an ambient temperature and an atmospheric pressure in the Virtual environment.

10. The simulation system according to claim 7, wherein the position of the soldier in the virtual environment is fixed by applying a predefined offset with respect to an avatar of an observer accompanying the soldier in the virtual environment.

11. A method implemented by a firing-simulation scope installed on a rifle and which includes an inertial measurement unit, a device for adjusting windage correction, an electronic system, a microphone, a display, and a connection interface for connection to a control station, the method performed by the electronic system comprising:
- receiving, via the connection interface, video data representing a field of view, through a simulated scope, in a virtual environment;
- displaying, on the display, the received video data;
- obtaining an audio recording made in real time by the microphone;
- comparing the audio recording with a predetermined signature of firing triggering with the rifle; and
- transmitting to the control station via the connection interface, when the audio recording matches the predetermined signature of firing, a firing triggering detection signal associated with inertial measurements supplied by the inertial measurement unit and with an adjustment setting supplied by the device for adjusting windage correction so as to enable the control station to determine a firing trajectory in the virtual environment.

12. A method implemented by a simulation system including at the control station and the firing-simulation scope implementing the method according to claim 11, the firing-simulation scope being connected to the control station, the method comprising the step of:
- determining, by the control station, the firing trajectory in the virtual environment, when said control station receives the firing triggering detection signal from the firing-simulation scope connected thereto.

13. A non-transitory information storage medium storing a computer program comprising instructions for implementing the method according to claim 11, when said program is executed by a processor.

* * * * *